UNITED STATES PATENT OFFICE.

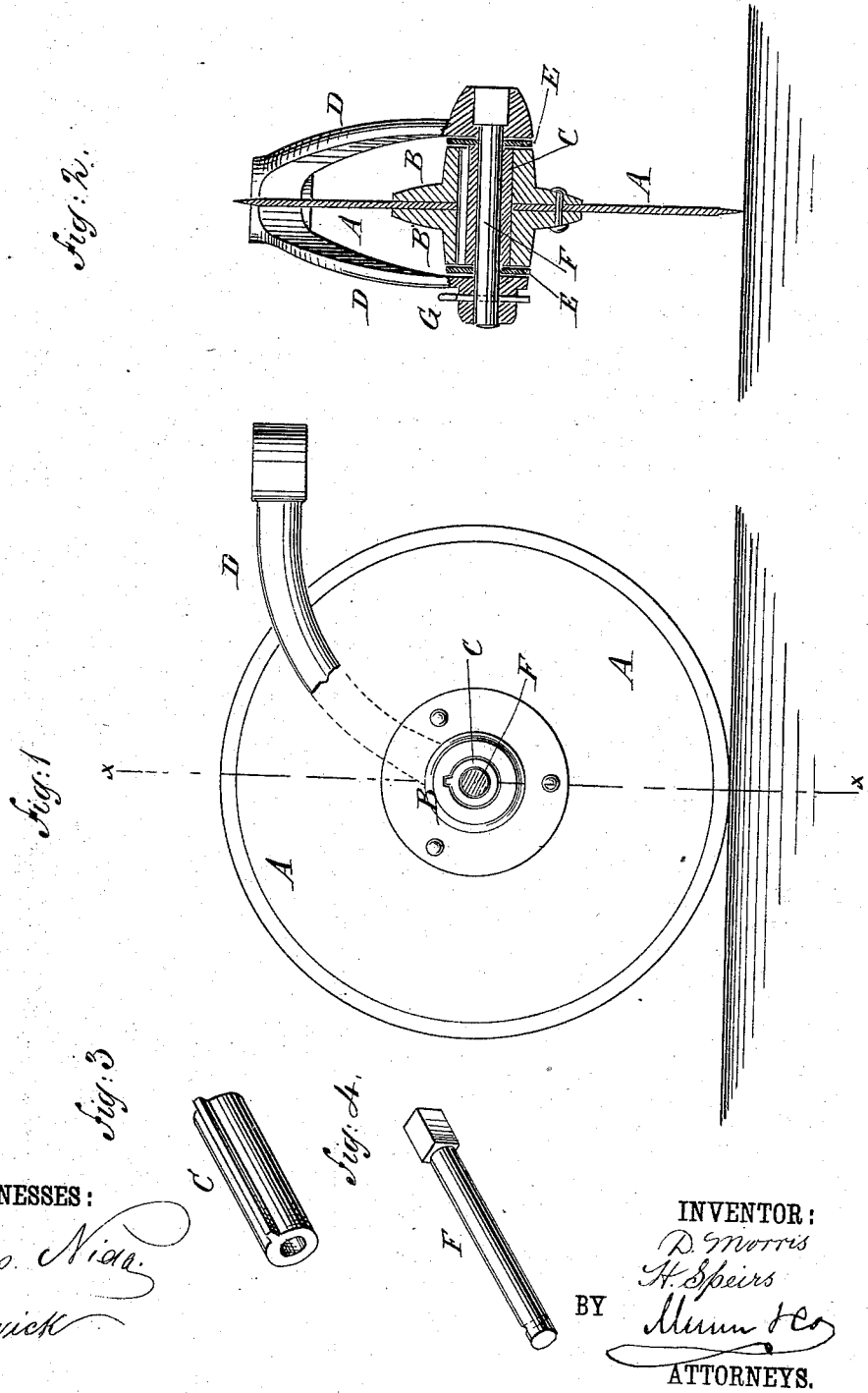

DAVID MORRIS AND HUGH SPEIRS, OF BUNKER HILL, ILLINOIS.

PLOW-COLTER.

SPECIFICATION forming part of Letters Patent No. 263,941, dated September 5, 1882.

Application filed April 25, 1882. (No model.)

*To all whom it may concern:*

Be it known that we, DAVID MORRIS and HUGH SPEIRS, both of Bunker Hill, in the county of Macoupin and State of Illinois, have invented a new and useful Improvement in Plow-Colters, of which the following is a full, clear, and exact description.

Reference is to be had to the accompanying drawings, forming a part of this specification, in which similar letters of reference indicate corresponding parts in all the figures.

Figure 1 is a side elevation, partly in section, of our improvement. Fig. 2 is a sectional front elevation of the same, taken through the line $x\, x$, Fig. 1. Fig. 3 is a perspective view of the metallic bushing. Fig. 4 is a perspective view of the wooden journal.

The object of this invention is to promote the durability of plow-colters and enable them to be cheaply and easily replaced when worn.

The invention consists in a plow-colter constructed with a blade provided with a hub having a removable metallic bushing inserted in it, and a wooden journal passed through the bushing and attached to the ends of the colter-yoke, one of said ends being countersunk to receive the head of the journal, and the other end perforated to receive a pin passed through the opposite end of the journal, and leather washers are inserted between the ends of the hub and bushing and the yoke, whereby the wear will be lessened and the parts subject to wear can be readily and cheaply renewed, as will be hereinafter fully described.

A represents the colter-blade, to the opposite sides of the center of which are secured by rivets the flanged inner ends of the two parts of the hub B. Within the bore of the hub B is placed a metallic bushing, C, which is kept from turning within the said bore by a tongue and groove or other suitable means that will allow it to be readily driven out when desired. The hub B is fitted in between the ends of the fork or yoke D, space being left to receive the leather washers E, to prevent the ends of the yoke from being worn.

F is a wooden journal, which is passed through the bushing C and through holes in the ends of the yoke D. Upon one end of the journal F is formed a square head which fits into a square countersink in one end of the yoke D, the said journal being made of such a length that its ends will be flush with the outer sides of the ends of the said yoke D, so that there will be no projecting ends for rubbish to collect upon. The journal F is kept in place by a pin, G, passed through its forward end and through the end of the yoke D. The journal F can be made of any suitable wood, but preferably of Osage orange or bois d'arc, as it does not shrink and swell, has no grain, and wears smooth when in contact with a metallic surface.

With this construction the bushing C and journal F, when worn, can be readily removed and cheaply replaced with new ones by the farmer without its being necessary to send the colter to a shop.

Having thus described our invention, we claim as new and desire to secure by Letters Patent—

In a plow-colter, the combination, with the colter A, having feathered to its hub B a sleeve, C, of the yoke D, having one end apertured and the other end countersunk, the washers E, and the journal F, with its head let into the countersink of the yoke and pinned to the apertured end of the yoke, substantially as and for the purpose set forth.

DAVID MORRIS.
HUGH SPEIRS.

Witnesses:
D. H. JOHNSTON,
J. S. PATRICK.